3,347,939
CONVERSION OF NITROOLEFINS TO NITROALCOHOLS

Giovanni A. Bonetti, Wilmington, Del., and Rudolph Rosenthal, Broomall, Pa., assignors to The Atlantic Refining Company, Philadelphia, Pa., a corporation of Pennsylvania
No Drawing. Filed May 21, 1965, Ser. No. 457,818
8 Claims. (Cl. 260—641)

This invention relates to a method for the conversion of 1-nitro-1-olefins to 1-nitro-2-alkanols and more particularly it relates to the hydration of 1-nitro-1-olefins to 1-nitro-2-alkanols by the use of a mildly basic aqueous solution.

The conversion of 1-nitro-1-olefins to 1-nitro-2-alkanols can be accomplished in the presence of acids but in general the yields are low and long reaction times are required. It now has been found that the hydration of these nitroolefins to their corresponding nitroalcohols can be accomplished readily and in good yields in mildly basic aqueous solutions.

It is an object of this invention therefore to provide a method for the conversion of 1-nitro-1-olefins to 1-nitro-2-alkanols in good yields.

It is another object of this invention to provide a method for the hydration of 1-nitro-1-olefins to 1-nitro-2-alkanols by the use of a mildly basic aqueous solution.

Other objects of this invention will be apparent from the description and claims that follow.

In accordance with this invention 1-nitro-1-olefins are converted to 1-nitro-2-alkanols by contacting the olefin with water under mildly basic conditions, i.e. at a pH in the range of from about 7.1 to 11.5, and at temperatures in the range of from about 25° C. to 130° C. in the presence of a mutual solvent for the water and the nitroolefin.

The nitroolefins which may be converted in accordance with the instant invention are those having the formula

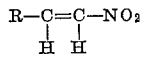

wherein R is an alkyl group having from 2 to 22 carbon atoms and may be either straight or branched chain. The particularly preferred compounds are those wherein the R group contains from 6 to 14 carbon atoms. The corresponding 1-nitro-2-alkanols produced therefrom have the formula

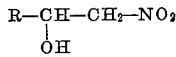

wherein R is the same alkyl group as described for the nitroolefin.

The desired pH is obtained preferably by utilizing aqueous solutions of inorganic compounds, preferably aqueous solutions of certain alkali metal compounds and alkaline earth metal compounds. Examples of these compounds which may be utilized to give aqueous solutions in the desired pH range are sodium acetate, sodium nitrite, calcium carbonate, magnesium carbonate, magnesium oxide, disodium phosphate, and sodium carbonate. Compounds which have been found to be unsuitable since they give too high a pH are calcium oxide and sodium hydroxide, while sodium bisulfite has been found to be unsuitable since it gives too low a pH (acidic) solution.

In general the compounds which are suitable are characterized by having a pH in the range of from 7.1 to 11.5 as a 1 molar solution in water or as a saturated solution in the case of those compounds which are not sufficiently soluble in water to give a 1 molar solution. Of those compounds listed above, calcium carbonate, magnesium carbonate and magnesium oxide are not sufficiently soluble to give a 1 molar solution but as a saturated solution at 25° C. have pH's of approximately 7.5, 9.5 and 10.3, respectively. The calcium oxide also is not sufficiently soluble in water to give a 1 molar solution but a saturated solution at 25° C. gives a solution having a pH of approximately 12.5 which is too basic to be suitable for the instant conversion process. Sodium hydroxide cannot be utilized since even in dilute solutions such as 0.1 molar, the pH is too high to give the desired high conversion in the instant reaction.

In order to carry out the hydration reaction in accordance with this invention it is necessary to have a mutual solvent for the water and the nitroolefin. Examples of solvents in which both the water and nitroolefin are soluble are para-dioxane, ethylene glycol dimethyl ether, ethylene glycol diethyl ether, diethylene glycol dimethyl ether, diethylene glycol diethyl ether and similar solvents.

The hydration reaction is carried out by heating to a temperature between 25° C. and 130° C. the nitroolefin, water, mutual solvent and inorganic compound utilized to give the desired pH. The temperature is held at the desired level for from 5 minutes to 18 hours, the short reaction times being utilized with the high temperatures and the long reaction times being required for the low reaction temperatures. Thus at 25° C., from 16 to 24 hours reaction time is preferred, but at 130° C. from 5 to 10 minutes are sufficient. At intermediate temperatures, for example 90° C. to 100° C., from 1 to 2 hours reaction time is generally sufficient.

The following examples are provided to illustrate specific embodiments of the invention but are not to be construed as limiting the invention thereto.

In all of the examples which follow, the 1-nitro-1-olefin (except where noted) was 1-nitrooctene-1 which analyzed 89 weight percent purity, the impurities being predominantly unidentified nitrogen-containing compounds which were not individually identified, but which were not nitroalcohols. The 1-nitrooctene-1 was utilized for purposes of uniformity in studying the hydration reaction.

Example I

A mixture of 2 grams of 1-nitrooctene-1, 0.05 grams of sodium acetate, 20 ml. of water and 50 ml. of dioxane was heated to reflux (90° C.) with stirring for two hours. The mixture was cooled, neutralized with dilute HCl and 250 ml. of water was added. The aqueous product was extracted with ether which was then removed by evaporation under vacuum. The residue, weighing 2.04 grams, analyzed 65 weight percent 1-nitrooctanol-2 and 18 weight percent 1-nitrooctene-1. This represented an 80 percent conversion of the nitroolefin charge and an 84 percent yield of nitroalcohol based on the converted nitroolefin.

Example II

A mixture of 4 grams of the 1-nitrooctene-1, 0.1 grams of sodium acetate, 40 ml. of water and 100 ml. of dioxane was heated to reflux with stirring for four hours. The product was recovered as in Example I and analyzed 74 percent 1-nitrooctanol-2 and 11 percent 1-nitrooctene-1. This example shows that as the reaction time is lengthened the conversion to the nitrooctanol increases but that the increase is not large.

Example III

A mixture of 2 grams of the 1-nitrooctene-1, 20 ml. of water, 50 ml. of para-dioxane and 1 gram of sodium acetate was stirred for 16 hours at approximately 25° C. The product was recovered as described in Example I, weighed 1.87 grams and analyzed 19 percent 1-nitrooctanol-2 and 57 percent 1-nitrooctene-1. This experiment shows that conversion is obtained at low temperatures, however, long reaction times are required.

Example IV

A mixture of 2 grams of 1-nitrooctene-1, 20 ml. of water, 50 ml. of para-dioxane and 1 gram of sodium acetate was heated with stirring at 50° C. for 16.5 hours. The product recovered as described in Example I weighed 1.89 grams and analyzed 46 weight percent 1-nitrooctanol-2 and less than 5 weight percent unreacted nitroolefin. This experiment shows that essentially complete conversion can be obtained at 50° C. with long reaction times but that the yields are not as high as obtained at the higher temperatures.

Example V

A mixture of 2 grams of 1-nitrooctene-1, 20 ml. of water, 50 ml. of para-dioxane and 0.1 gram of sodium acetate was refluxed for 1 hour. The product recovered as in Example I weighed 1.8 grams and analyzed 58 weight percent 1-nitrooctene-1. This example shows that satisfactory yields and conversions are obtained with 5 percent concentration of sodium acetate as compared with 2.5 percent concentration in Example I, since the pH of the solution is still within the 7.1 to 11.5 range.

Example VI

A mixture of 2 grams of 1-nitrooctene-1, 20 ml. of water, 50 ml. of para-dioxane and 0.2 gram sodium acetate was refluxed for 2 hours. The product recovered as in Example I weighed 1.72 grams and analyzed 46 percent 1-nitrooctanol-2 and 15 percent 1-nitrooctene-1. This experiment shows that lower yields and conversions are obtained with the 10 percent concentration of sodium acetate under the same conditions as compared with the 5 percent and 2.5 percent of Examples V and I, respectively.

Example VII

The same mixture utilized in Example VI was refluxed for ½ hour. It gave 2 grams of product analyzing 43 percent 1-nitrooctanol-2 and 22 percent 1-nitrooctene-1, showing that lower yields are obtained even with shorter reaction times with the higher concentration of sodium acetate.

Example VIII

A mixture of 4 grams of 1-nitrohexadecene-1, 20 ml. of water, 120 ml. of para-dioxane and 0.2 gram of sodium acetate was refluxed for ½ hour. A sample was taken and recovered as described in Example I. The residue weighed 0.91 gram and analyzed 15 weight percent 1-nitrohexadecanol-2 and 80 weight percent 1-nitrohexadecene-1. The remainder of the reactants were refluxed for an additional ½ hour and a second sample removed. The product recovered as described in Example I weighed 0.96 gram and analyzed 23 weight percent 1-nitrohexadecanol-2 and 70 weight percent 1-nitrohexadecene-1. The remaining reactants in the mixture were refluxed for an additional hour and the product recovered as described in Example I weighed 2.09 grams and analyzed 31 weight percent 1-nitrohexadecanol-2 and 52 weight percent 1-nitrohexadecene-1.

Example IX

A mixture of 2 grams of 1-nitrooctene-1, 20 ml. of water, 50 ml. of para-dioxane and 0.1 gram of sodium nitrite was refluxed for one hour. The product recovered as in Example I weighed 1.96 grams and analyzed 57 weight percent 1-nitrooctanol-2 and 22 weight percent 1-nitrooctene-1.

Example X

A mixture of 2 grams of 1-nitrooctene-1, 20 ml. of water, 50 ml. of para-dioxane and 0.2 gram of sodium nitrite was refluxed for one hour. The product recovered as in Example I, analyzed 47 weight percent 1-nitrooctanol-2 and 16 weight percent 1-nitrooctene-1. A comparison of Examples IX and X shows that it is preferable to use the 5 percent solution of the salt which is somewhat less basic.

Example XI

To a solution of 2 grams of 1-nitrooctene-1 in 50 ml. of para-dioxane heated to reflux was added 0.05 gram of magnesium oxide in 20 ml. of water. After 1 hour of reflux the product was recovered as in Example I and gave 1.91 grams of material analyzing 55 weight percent 1-nitrooctanol-2 and 24 weight percent 1-nitrooctene-1.

Example XII

To a refluxing solution of 4 grams of 1-nitrohexadecene-1 in 100 ml. of para-dioxane was added a mixture of 0.2 gram of magnesium oxide and 20 ml. of water. After refluxing for ½ hour a sample of product was taken and recovered as described in Example I. It weighed 1.09 grams and analyzed 16 weight percent 1-nitrohexadecanol-2 and 56 weight percent 1-nitrohexadecene-1. The remaining material was allowed to reflux for an additional ½ hour and a second sample of the product was recovered as described in Example I. It weighed 1.07 grams and analyzed 24 weight percent 1-nitrohexadecanol-2 and 66 weight percent 1-nitrohexadecene-1. The remaining material was refluxed for an additional hour and the product recovered weighed 1.78 grams, analyzed 31 weight percent 1-nitrohexadecanol-2 and 56 weight percent 1-nitrohexadecene-1.

Example XIII

A mixture of 2 grams of pure 1-nitrooctene-1, 20 ml. of water, 50 ml. of para-dioxane and 0.5 gram of calcium carbonate was refluxed for 1 hour and the product weighing 1.92 grams recovered as described in Example I analyzed 53 weight percent 1-nitrooctanol-2 and 33 weight percent 1-nitrooctene-1.

Example XIV

A mixture of 2 grams of pure 1-nitrooctene-1, 10 ml. of water, 50 ml. of para-dioxane and 0.05 gram calcium carbonate was refluxed for 2 hours and the product weighing 1.95 grams was recovered as described in Example I. The product analyzed 41 weight percent 1-nitrooctanol-2 and 46 weight percent 1-nitrooctene-1. In comparing this example with the previous example it is apparent that an insufficient amount of calcium carbonate was employed to give the optimum yield.

Example XV

A mixture of 2 grams of pure 1-nitrooctene-1, 10 ml. of water, 50 ml. of para-dioxane and 0.02 gram of magnesium carbonate was refluxed for 2 hours. The product weighing 1.92 grams was recovered as described in Example I. It analyzed 30 weight percent 1-nitrooctanol-2 and 64 weight percent 1-nitrooctene-1.

Example XVI

A mixture of 2 grams of the 1-nitrooctene-1 of 89 weight percent purity as described above, 20 ml. water, 50 ml. of para-dioxane and 0.1 gram disodium phosphate was refluxed for 1 hour. The product weighing 1.99 grams recovered as described in Example I analyzed 49 weight percent 1-nitrooctanol-2 and 21 weight percent 1-nitrooctene-1.

Example XVII

A mixture of the 89 weight percent pure 1-nitrooctene-1, 20 ml. water, 50 ml. para-dioxane and 0.1 gram calcium oxide was refluxed for ½ hour and the product recovered as described in Example I. The product weighing 1.54 grams analyzed 36 weight percent 1-nitrooctanol-2 and 21 weight percent 1-nitrooctene-1. It will be seen from these results that the calcium oxide gives too highly a basic solution to give a useful conversion or yield.

Example XVIII

A mixture of 2 grams of the 89 weight percent purity 1-nitrooctene-1, 10 ml. of water, 50 ml. of para-dioxane and 0.1 gram of sodium bisulfite was refluxed for 1 hour. No evidence of nitroalcohol formation could be noted by infrared analysis. The sodium bisulfite gave an acid solution, i.e. a pH below 7.

*Example XIX*

A mixture of 2 grams of the 89 weight percent pure 1-nitrooctene-1, 20 ml. of water, 100 ml. of para-dioxane and 10 grams of a commercial anion exchange resin in the hydroxyl form was refluxed for 2 hours. No 1-nitrooctanol-2 was identifiable in the products by infrared analysis.

*Example XX*

A mixture of 2 grams of 89 weight percent 1-nitrooctene-1, 20 ml. of water, 20 ml. of para-dioxane and 0.3 gram of sodium hydroxide was refluxed for 5 hours. A product weighing 1.49 grams in the form of a viscous polymeric material was recovered. No 1-nitrooctanol-2 could be identified.

*Example XXI*

A mixture of 2 grams of the 89 weight percent purity 1-nitrooctene-1, 10 ml. of water, 50 ml. of the para-dioxane and 6 ml. of 0.5 percent aqueous sodium hydroxide solution was refluxed for 1 hour. The product recovered as described in Example I analyzed 37 weight percent 1-nitrooctanol-2 and 25 weight percent 1-nitrooctene-1. It will be seen from Examples XIX, XX and XXI that solutions which were at a pH above about 11.5 are too basic to give the desired yield and conversion of the nitroolefin.

*Example XXII*

A mixture of 1 gram of the 89 weight percent purity 1-nitrooctene-1, 10 ml. of water, 50 ml. of the para-dioxane and 1 ml. of concentrated hydrochloric acid was refluxed for 1 hour. The product recovered as described in Example I weighted 0.72 gram and analyzed 83 weight percent 1-nitrooctene-1 with only a very small amount sufficient to be identified of 1-nitrooctanol-2. This example shows that acid solutions are not useful for the conversion of the nitroolefin to the nitroalcohol.

*Example XXIII*

A mixture of 4 grams of 1-nitrohexadecene-1, 20 ml. of water, 110 ml. of para-dioxane and 5 grams of a commercial cation exchange resin in the hydrogen (acid) form was refluxed for 19 hours. The product analyzed 21 weight percent 1-nitrohexadecanol-2 and 74 weight percent 1-nitrohexadecene-1. This solution also was too acidic to give a suitable yield and conversion in a reasonable reaction time.

*Example XXIV*

A mixture of 2 grams of the 89 weight percent purity 1-nitrooctene-1, 10 ml. of water, 35 ml. of para-dioxane and 5 grams of 10 percent phosphotungstic acid on carbon was refluxed for 5½ hours. The product weighing 1.32 grams recovered as described in Example I analyzed 16 weight percent 1-nitrooctanol-2 and 62 weight percent 1-nitrooctene-1. This example also shows that under mildly acidic conditions long reaction times are required and low yields are obtained.

*Example XXV*

Solvents such as ethylene glycol dimethyl ether, diethylene glycol dimethyl ether and similar solvents were found to be mutual solvents for the water and nitroolefins and could be substituted for the para-dioxane as the mutual solvent in the conversion reactions described in the previous examples. Accordingly, any mutual solvent for the nitroolefin and water may be utilized in the conversion reactions of this invention.

In each of the foregoing examples wherein suitable short reaction times and high yields and conversions were obtained the pH of the solution was in the range of from 7.1 to 11.5. When the pH was above this range either longer reaction times or lower yields and conversions or both were noted. The amount of compound which is utilized to give the desired basic solution should not be excessive and, although amounts ranging from 1 to 50 weight percent based on the nitroolefin may be employed, in general a concentration based on the weight of the nitroolefin of from 2 to 5 percent is preferred.

The 1-nitro-2-alkanols which are produced in accordance with this invention are useful in the production of anionic detergents by sulfation utilizing conventional methods, i.e. concentrated sulfuric or fuming sulfuric acid. Nonionic detergents may be prepared from the nitroalkanols by condensation with an alkylene oxide such as ethylene oxide or by esterification with a polyalkylene glycol, again in accordance with well-known conventional processes. The nitroalkanols also may be utilized as solvents and plasticizers, particularly for nitrocellulose and they may be utilized in the production of various polymeric materials.

We claim:

1. A method for converting 1-nitro-1-olefins having the formula

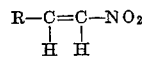

to 1-nitro-2-alkanols having the formula

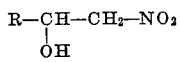

wherein R is an alkyl group having from 2 to 22 carbon atoms, which comprises contacting said 1-nitro-1-olefin with water at a temperature in the range of from 25° C. to 130° C. and at a pH in the range of from 7.1 to 11.5 in the presence of a mutual solvent for the water and said 1-nitro-1-olefin and recovering said 1-nitro-2-alkanol.

2. A method for converting 1-nitro-1-olefins having the formula

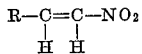

to 1-nitro-2-alkanols having the formula

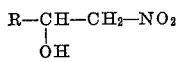

wherein R is an alkyl group having from 2 to 22 carbon atoms, which comprises contacting said 1-nitro-1-olefin with water at a temperature in the range of from 25° C. to 130° C. and at a pH in the range of from 7.1 to 11.5 in the presence of para-dioxane and recovering said 1-nitro-2-alkanol.

3. A method for converting 1-nitro-1-olefins having the formula

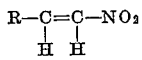

to 1-nitro-2-alkanols having the formula

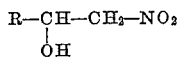

wherein R is an alkyl group having from 2 to 22 carbon atoms, which comprises contacting said 1-nitro-1-olefin with an aqueous solution of sodium acetate at a temperature in the range of from 25° C. to 130° C. in the presence of para-dioxane and recovering said 1-nitro-2-alkanol.

4. A method for converting 1-nitro-1-olefins having the formula

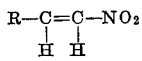

to 1-nitro-2-alkanols having the formula

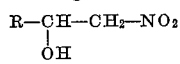

wherein R is an alkyl group having from 2 to 22 carbon atoms, which comprises contacting said 1-nitro-1-olefin with an aqueous solution of sodium nitrite at a temperature in the range of from 25° C. to 130° C. in the presence of para-dioxane and recovering said 1-nitro-2-alkanol.

5. A method for converting 1-nitro-1-olefins having the formula $$R-C=C-NO_2$$
$$\phantom{R-}|\phantom{=}|$$
$$\phantom{R-C=C-}H\phantom{=}H$$

to 1-nitro-2-alkanols having the formula $$R-CH-CH_2-NO_2$$
$$\phantom{R-}|$$
$$\phantom{R-C}OH$$

wherein R is an alkyl group having from 2 to 22 carbon atoms, which comprises contacting said 1-nitro-1-olefin with an aqueous solution of magnesium oxide at a temperature in the range of from 25° C. to 130° C. in the presence of para-dioxane and recovering said 1-nitro-2-alkanol.

6. A method for converting 1-nitro-1-olefins having the formula $$R-C=C-NO_2$$
$$\phantom{R-}|\phantom{=}|$$
$$\phantom{R-C=C-}H\phantom{=}H$$

to 1-nitro-2-alkanols having the formula $$R-CH-CH_2-NO_2$$
$$\phantom{R-}|$$
$$\phantom{R-C}OH$$

wherein R is an alkyl group having from 2 to 22 carbon atoms, which comprises contacting said 1-nitro-1-olefin with an aqueous solution of calcium carbonate at a temperature in the range of from 25° C. to 130° C. in the presence of para-dioxane and recovering said 1-nitro-2-alkanol.

7. A method for converting 1-nitro-1-olefins having the formula $$R-C=C-NO_2$$
$$\phantom{R-}|\phantom{=}|$$
$$\phantom{R-C=C-}H\phantom{=}H$$

to 1-nitro-2-alkanols having the formula $$R-CH-CH_2-NO_2$$
$$\phantom{R-}|$$
$$\phantom{R-C}OH$$

wherein R is an alkyl group having from 2 to 22 carbon atoms, which comprises contacting said 1-nitro-1-olefin with an aqueous solution of magnesium carbonate at a temperature in the range of from 25° C. to 130° C. in the presence of para-dioxane and recovering said 1-nitro-2-alkanol.

8. A method for converting 1-nitro-1-olefins having the formula $$R-C=C-NO_2$$
$$\phantom{R-}|\phantom{=}|$$
$$\phantom{R-C=C-}H\phantom{=}H$$

to 1-nitro-2-alkanols having the formula $$R-CH-CH_2-NO_2$$
$$\phantom{R-}|$$
$$\phantom{R-C}OH$$

wherein R is an alkyl group having from 2 to 22 carbon atoms, which comprises contacting said 1-nitro-1-olefin with an aqueous solution of disodium phosphate at a temperature in the range of from 25° C. to 130° C. in the presence of para-dioxane and recovering said 1-nitro-2-alkanol.

References Cited

UNITED STATES PATENTS

| 2,417,380 | 4/1947 | Smith et al. | 260—644 |
| 2,840,597 | 6/1958 | McKinnis | 260—641 |
| 2,886,602 | 5/1959 | McKinnis | 260—632 |

FOREIGN PATENTS

| 389,136 | 3/1933 | Great Britain. |

LEON ZITVER, *Primary Examiner.*

J. E. EVANS, *Assistant Examiner.*